United States Patent
Hughes

(10) Patent No.: US 9,641,972 B1
(45) Date of Patent: May 2, 2017

(54) ASSOCIATING GEOGRAPHIC ATTRIBUTES WITH A PHYSICAL LOCATION INCLUDING A THRESHOLD PORTION OF A GEOGRAPHIC REGION

(71) Applicant: Facebook, Inc., Menlo Park, CA (US)

(72) Inventor: Charles Joseph Hughes, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/063,457

(22) Filed: Mar. 7, 2016

(51) Int. Cl.
H04W 24/00 (2009.01)
H04W 4/02 (2009.01)
H04L 29/08 (2006.01)

(52) U.S. Cl.
CPC ............ *H04W 4/021* (2013.01); *H04L 67/306* (2013.01)

(58) Field of Classification Search
CPC ............................ H04W 4/021; H04L 67/306
USPC ............... 45/456.1, 456.5, 456.6, 457, 414.2
See application file for complete search history.

(56) References Cited

U.S. PATENT DOCUMENTS 9,288,620 B2 * 3/2016 Menendez ............ H04W 4/021
2015/0095355 A1 * 4/2015 Patton ............... G06F 17/30241
707/754

* cited by examiner

*Primary Examiner* — Wayne Cai
(74) *Attorney, Agent, or Firm* — Fenwick & West LLP

(57) ABSTRACT

An online system receives a description of a physical location associated with a content item and a threshold distance of the physical location. To identify users eligible to be presented with the content item, the online system divides a geographic map of the physical location associated with the content item into a plurality of geo-tiles each representing a portion of the map. The online system computes and stores values describing portions of a geographic region represented by certain geo-tiles and associates the geographic region with the physical location if the stored values equal or exceed a threshold value. If the geographic region is associated with the physical location, users associated with the geographic region are identified by the online system as eligible to receive the content item.

20 Claims, 8 Drawing Sheets

FIG. 8

Target Location: 37.76°N, 122.4°W

| Geographic Region | Geo-Tile ID | Geo-fence ID: 003070706074 Tile Representing Region (%) | Geo-fence Area: 28.27 Mi² Region Represented by Tile (%) |
|---|---|---|---|
| San Francisco, CA Area: 46.9 Mi² Coverage: 52.7% (24.7 Mi²) | 6001 | 100 | 0.13 |
| | 6002 | 100 | 1.60 |
| | 6003 | 100 | 1.72 |
| | 6004 | 62 | 0.49 |
| | 6005 | 100 | 1.65 |
| | 6006 | 100 | 2.50 |
| | 6007 | 100 | 3.33 |
| | 6008 | 100 | 3.21 |
| | 6009 | 61 | 2.57 |
| | 60010 | 100 | 2.60 |
| | 60011 | 100 | 2.58 |
| | ... | ... | ... |
| | 6301 | 96 | .013 |
| | 6302 | 100 | .012 |
| | 6303 | 82 | .003 |
| | 6304 | 48 | .002 |
| | 6305 | 98 | .05 |
| | 6306 | 62 | .004 |
| | 6307 | 100 | .024 |
| | 6308 | 88 | .02 |
| | 6309 | 54 | .05 |
| | 63010 | 90 | .014 |
| | 63011 | 50 | .001 |
| | | Total: 97.5% | 52.7% |

800

ASSOCIATING GEOGRAPHIC ATTRIBUTES WITH A PHYSICAL LOCATION INCLUDING A THRESHOLD PORTION OF A GEOGRAPHIC REGION

BACKGROUND

This disclosure relates generally to online systems, and more specifically to presenting content to users of an online system.

Online systems, such as social networking systems, allow users to connect to and to communicate with other users of the online system. Users may create profiles on an online system that are tied to their identities and include information about the users, such as interests and demographic information. The users may be individuals or entities, such as corporations or charities. Online systems allow users to easily communicate and share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow users (e.g., businesses) to sponsor presentation of content on an online system to gain public attention for a user's products or services or to persuade other users to take an action regarding the user's products or services. Content for which the online system receives compensation in exchange for presenting to users is referred to as "sponsored content." Many online systems receive compensation from a user for presenting other online system users with certain types of sponsored content provided by the user. Frequently, online systems charge a user for each presentation of sponsored content to an online system user or for each interaction with sponsored content by an online system user. For example, an online system receives compensation from a user each time a content item provided by the user is displayed to another user on the online system, each time another user interacts with a content item from the user presented by the online system (e.g., selects a link included in the content item), or each time another user performs another action after being presented with the content item (e.g., visits a physical location associated with the user who provided the content item to the online system).

Content items may be associated with targeting criteria that identify characteristics of online system users eligible to be presented with the content item. For example, a content item is eligible to be presented to an online system user having characteristics satisfying at least a threshold amount of targeting criteria associated with the content item; however, the content item is not eligible to be presented to another online system user having characteristics satisfying less than the threshold amount of targeting criteria associated with the content item. Targeting criteria associated with a content item are often specified by a user providing the content item to an online system. For example, content items describing a particular restaurant are associated with targeting criteria identifying a threshold frequency of checking-in to the restaurant or to similar restaurants via the online system, profile information maintained by the online system including dining out as an interest or hobby, and indicating a preference for a page about the restaurant on the online system. Hence, targeting criteria associated with a content item allows an online system to identify users who are most likely to be interested in being presented with a particular content item as eligible be presented with the content item.

Some content items may be more relevant to some users than to other users based on physical locations associated with the users. For example, content items describing a particular restaurant in the city of San Francisco are more likely to be relevant to users who frequently visit the area where the restaurant is located or who are current or former residents of San Francisco than to users who are not associated with the area or with the city. Hence, targeting criteria associated with content items often identify a threshold distance from a physical location associated with the content items to identify users associated with a location within the threshold distance of the content items as eligible to be presented with the content items on the online system. Therefore, targeting criteria associated with content items describing the restaurant in the previous example may specify a threshold distance from the physical location of the restaurant for a current location of online system users or for another location associated with online system users.

Conventional online systems do not identify users associated with locations greater than a threshold distance of a physical location specified by targeting criteria associated with a content item as eligible to be presented with the content item. However, some users associated with locations that do not satisfy targeting criteria associated with the content item are interested in being presented with the content item. For example, the online system does not identify a user living in San Francisco as eligible to be presented with a content item associated with a restaurant if a location associated with the user is not within a threshold distance of the location of the restaurant specified by targeting criteria associated with the content item, even though the user may have an interest in the restaurant. Accordingly, targeting criteria including location information may inadvertently prevent presentation of content items associated with the targeting criteria from users who would be interested in being presented with the content items. Although online systems may attempt to identify users who would be interested in receiving content items associated targeting criteria identifying physical locations but who are not associated with locations satisfying the targeting criteria, identifying such users involves additional time when selecting content items for to users, which may decrease user interaction with the online system.

SUMMARY

An online system identifies users eligible to be presented with a content item on the online system based on a geographic attribute associated with the users. In various embodiments, the geographic attribute describes a geographic region including a specific physical location or including a portion of an area surrounding the specific physical location. For example, the online system identifies users associated with a hometown of a particular city and determines the users are eligible to be presented with a content item associated with a geographic landmark in the city if a threshold portion of the city is included within a threshold distance of the landmark. Example geographic attributes include: a hometown, a workplace, a birthplace, a current location, or any other information describing a geographic region.

In various embodiments, the online system associates users with the geographic attribute based on declarative information provided to the online system by the users. In some embodiments, the online system associates users with the geographic attribute based on location information received by the online system. For example, the online system associates a user with a geographic attribute in response to receiving a threshold amount of location information from client devices associated with the user within a threshold distance of a specific physical location included in the geographic attribute or in response to receiving a threshold number of check-ins by the user at locations within the threshold distance of the specific physical location included in the geographic attribute.

Additionally, a user may associate a physical location and a threshold distance from the physical location with a content item. For example, a user providing an advertisement request ("ad request") to the online system identifies a physical location associated with the ad request and a maximum distance of two miles from the physical location, so an advertisement from the ad request is eligible for presentation to users associated with physical locations less than two miles from the identified physical location. Hence physical location and a threshold distance from the physical location associated with the content item act as targeting criteria for the content item. Hence, the online system determines whether a user is eligible to be presented with the content item based at least in part on the geographic attribute associated with the user and the physical location and the threshold distance associated with the content item.

To determine whether a user is eligible to receive a content item associated with a physical location based on a geographic attribute associated with the user, the online system determines whether an area within a specified distance (or "geo-fence") from the physical location associated with the content item includes at least threshold portion of the geographic region corresponding to the geographic attribute associated with the user. For example, the online system determines whether a geo-fence surrounding a physical location associated with a content item includes at least eighty percent of a city identified as a hometown of a user. If at least the threshold portion of the geographic region corresponding to the geographic attribute associated with the user is included in the geo-fence from the physical location associated with a content item, the online system determines the user is eligible to be presented with the content item. For example, the online system determines a user is eligible to receive a content item associated with targeting criteria including a physical location and a threshold distance of the physical location if a geographic attributes associated with the user identifies a hometown determined to have at least a threshold portion included in a geo-fence based on the threshold distance surrounding the physical location included in the targeting criteria.

To determine a portion of a geographic region within a specified distance (i.e., a "geo-fence") of a physical location, the online system divides a map of a geographic area including the physical location into a plurality of geo-tiles that each represent an area within the specified distance of the physical location and associates a geo-tile identifier with each geo-tile. In some embodiments, the online system retrieves a set of geo-tiles associated with the map of the physical location and stores geo-tile identifiers associated with each geo-tile. A size of a geo-tile may be based on the density of objects (e.g., buildings, streets, population, etc.) included in the geographic area included in the geo-tile, in some embodiments. For example, each geo-tile represents a geographic area having a density of objects within a threshold amount of densities of objects of geographic areas represented by other geo-tiles. In the preceding example, geographic areas including a low number of objects are represented by larger geo-tiles, while geographic areas including a high number of objects are represented by smaller geo-tiles. Additionally, the geographic region including the physical location and geo-fence may be represented by multiple layers of geo-tiles, with different layers representing different levels of geo-tile resolution. For example, a layer includes geo-tiles having a higher level of resolution representing smaller geographic areas with greater specificity of identifiable objects within the geo-tiles, while another layer includes geo-tiles having a lower level of resolution representing larger geographic areas with less specificity of identifiable objects within the geo-tiles.

Based on the geo-tiles representing areas of the map of the geographic area including the physical location, the online system determines whether a threshold amount of a geographic region is within the specified distance (i.e., the geo-fence) of the physical location. The online system generates an index including geo-tiles within the geo-fence of the physical location having a portion of each geo-tile within the geographic region. Information including a geo-tile identifier for each geo-tile in the index and a value describing a portion of the geographic region included in each geo-tile in the index is stored by the online system. For example, the online system identifies geo-tiles representing at least a portion of a zip code, computes a portion of the zip code represented by each of the identified geo-tiles, and stores the portion of the zip code represented by each of the identified geo-tiles along with corresponding geo-tile identifiers for the identified geo tiles. In various embodiments, the value describing the portion of the geographic region included in each geo-tile is a percentage of the area of the geographic region represented by the geo-tile. For example, the online system retrieves information describing a size of the geographic region, determines a size of the geographic area included in a geo-tile, and determines the value for the geo tile based on the size of the geographic area included in the geo-tile and the size of the geographic region. In some embodiments, the online system stores additional information describing the geographic region (e.g., name, type, geographic coordinates, size, etc.) in association with the value and the geo-tile identifier.

For each geo-tile having at least a threshold portion of the geo-tile within the geographic region, the online system computes the value describing the portion of the geographic region included in the geo-tile and stores the value in association with the corresponding geo-tile identifier. However, for a geo-tile having at least a portion of the geo-tile within the geographic region that is less than the threshold portion, the online system computes the value based on a set of smaller geo-tiles collectively representing the same geographic area as the geo-tile. In some embodiments, the online system divides the geo-tile into smaller geo-tiles each representing a portion of the divided geo-tile. In other embodiments, the online system retrieves a set of additional geo-tiles each representing a portion of the divided geo-tile.

In some embodiments, the online system iteratively divides a geo-tile having at least a portion of the geo-tile within the geographic region that is less than the threshold portion into sets of smaller geo-tiles. During each iteration, the online system identifies geo-tiles having at least a threshold portion of the geo-tile within the geographic region, computes the value describing the portion of the geographic region represented by each geo-tile, and stores the value in conjunction with a corresponding geo-tile identifier. Also during each progression, the online system also identifies geo-tiles having at least a portion of the geo-tile within the geographic region that is less than the threshold portion and divides the geo-tiles having at least a portion of the geo-tile within the geographic region that is less than the threshold portion until at least the threshold portion of the geographic region is within represented by each geo-tile. The online system then computes the value describing the portion of the geographic region represented by each geo-tile having at least threshold portion of the geo-tile within the geographic region and stores the value in conjunction with a corresponding geo-tile identifier. Hence, the index may include geo-tiles of varying sizes and resolutions representing geographic areas of various sizes and object densities.

The online system combines values associated with each geo-tile in the index and determines whether the combined value equals or exceeds a threshold value. If the combined value equals or exceeds the threshold value, the online system determines the geo-fence of the physical location includes at least threshold amount of the geographic region. For example, if the physical location is a city, the value associated with each geo-tile in the index is a percentage of the city represented by each geo-tile, and if a combined percentage of geo-tiles in the index equals or exceeds a threshold value, the online system determines a geographic region is within the geo-fence of the city. In embodiments where progressively smaller geo-tiles having a threshold area within the geographic region are indexed, the online system combines values associated with the smallest mutually exclusive geo-tiles in the index to determine the portion of the geographic region included in the geo-fence of the physical location. The online system may reference the index to identify geographic regions included in a geo-fence of physical location specified in targeting criteria associated with a content item when identifying users eligible to be presented with the content item. For example, when the online system receives a request for content from as, the online system references the index to identify geographic regions included in a geo-fence of a physical location associated with a content item and identifies the content item as eligible for presentation to users having geographic attributes including the identified geographic regions.

BRIEF DESCRIPTION OF THE DRAWINGS

FIG. 8 is an example index including stored values associated geo-tiles including at least a threshold portion of a geographic region, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
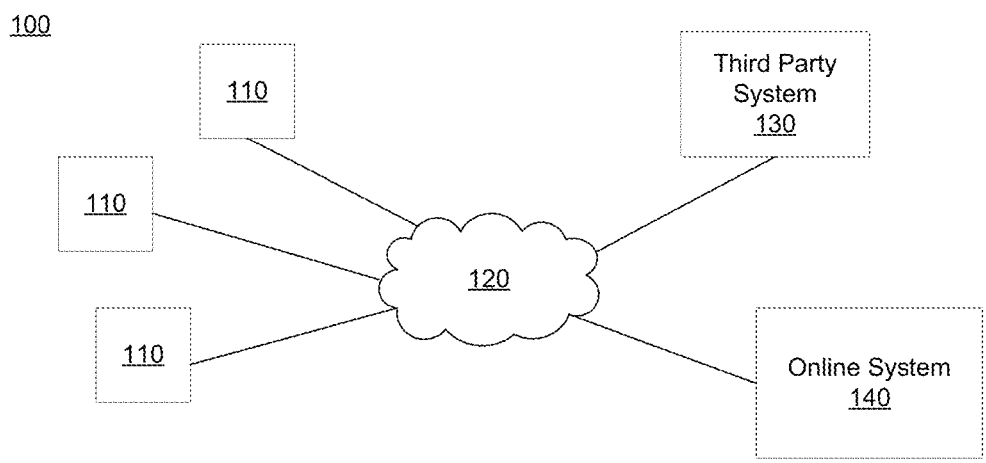
FIG. 1 is a block diagram of a system environment in which an online system operates, in accordance with an embodiment.

FIG. 1 is a block diagram of a system environment 100 for an online system 140.

The system environment 100 shown by FIG. 1 comprises one or more client devices 110, a network 120, one or more third-party systems 130, and the online system 140. In alternative configurations, different and/or additional components may be included in the system environment 100. The online system 140 may be a social networking system, a content sharing network, or other system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

In some embodiments, one or more of the third party systems 130 provide content to the online system 140 for presentation to users of the online system 140 and provide compensation to the online system 140 in exchange for presenting the content, also referred to herein as "sponsored content." For example, a third party system 130 provides advertisement requests, which are further described below in conjunction with FIG. 2, including advertisements for presentation and amounts of compensation provided by the third party system 130 to the online system 140 for presenting the advertisements. Other types of sponsored content may be provided by a third party system 130 to the online system 140 for presentation by the online system 140 in exchange for compensation from the third party system 130. Sponsored content from a third party system 130 may be associated with the third party system 130 or with an entity on whose behalf the third party system 130 operates.

Figure 2:
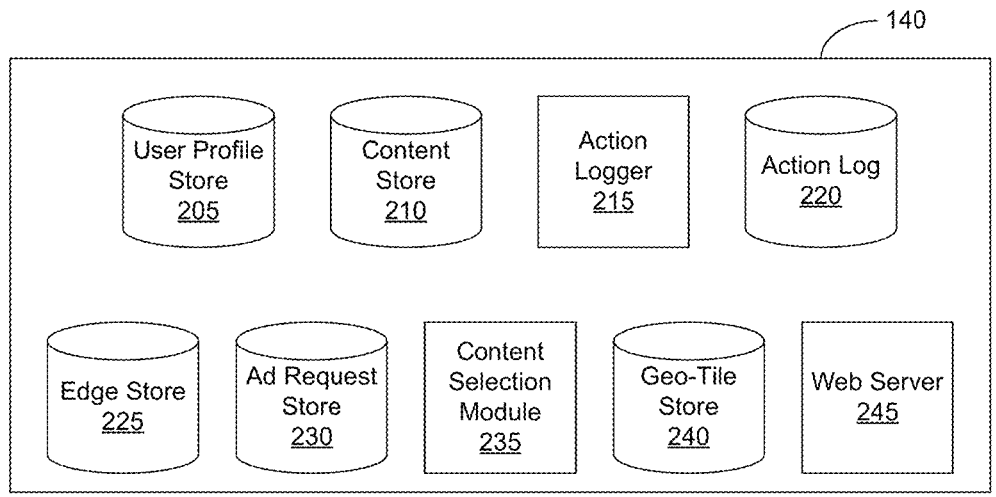
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an advertisement ("ad") request store 230, a content selection module 235, a geo-tile store 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

In some embodiments, the action logger 215 receives communications about user actions with content presented to a user and populates the action log 220 with information about the actions. Examples of interactions with content include viewing content items, requesting additional content items for presentation, indicating a preference for a content item, sharing a content item with another user, or performing any other suitable action. A user may interact with content items by providing inputs to a client device 110 presenting content from the online system 140. The client device 110 identifies actions corresponding to various provided inputs and communicates information describing the identified actions to the action logger 215, which stores the information describing the identified actions in the action log 220.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, a number of comments posted by a user about an object, or types of comments posted by a user about an object. The features may also represent information describing a particular object or a particular user. For example, a feature may represent a level of interest that a user has in a particular topic, a rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and the target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An ad request includes advertisement content, also referred to as an "advertisement," and a bid amount. The advertisement is text, image, audio, video, or any other suitable data presented to a user. In various embodiments, the advertisement also includes a landing page specifying a network address to which a user is directed when the advertisement content is accessed. The bid amount is associated with an ad request by an advertiser and is used to determine an expected value, such as monetary compensation, provided by the advertiser to the online system 140 if an advertisement in the ad request is presented to a user, if a user interacts with the advertisement in the ad request when presented to the user, or if any suitable condition is satisfied when the advertisement in the ad request is presented to a user. For example, the bid amount specifies a monetary amount that the online system 140 receives from the advertiser if an advertisement in an ad request is displayed. In some embodiments, the expected value to the online system 140 for presenting the advertisement may be determined by multiplying the bid amount by a probability of the advertisement being accessed by a user.

Additionally, an ad request may include one or more targeting criteria specified by the advertiser. Targeting criteria included in an ad request specify one or more characteristics of users eligible to be presented with advertisement content in the ad request. For example, targeting criteria are used to identify users associated with user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have performed a particular action, such as having sent a message to another user, having used an application, having joined or left a group, having joined an event, having generated an event description, having purchased or reviewed a product or service using an online marketplace, having requested information from a third party system 130, having installed an application, or having performed any other suitable action. Including actions in targeting criteria allows advertisers to further refine users eligible to be presented with advertisement content from an ad request. As another example, targeting criteria identifies users having a connection to another user or object or having a particular type of connection to another user or object. For example, targeting criteria in an ad request identifies users connected to an entity.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the online system 140 and based on the user's affinity for different content items. Information associated with the user included in the user profile store 205, in the action log 220, and in the edge store 225 may be used to determine the measures of relevance. Based on the measures of relevance, the content selection module 235 selects content items for presentation to the user. For example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include advertisements from ad requests or other content items associated with bid amounts. The content selection module 235 uses the bid amounts associated with ad requests when selecting content for presentation to the viewing user. In various embodiments, the content selection module 235 determines an expected value associated with various ad requests (or other content items) based on their bid amounts and selects advertisements from ad requests associated with a maximum expected value or associated with at least a threshold expected value for presentation. An expected value associated with an ad request or with a content item represents an expected amount of compensation received by the online system 140 for presenting an advertisement from the ad request or the content item. For example, the expected value associated with an ad request is a product of the ad request's bid amount and a likelihood of the user interacting with the advertisement content from the ad request. The content selection module 235 may rank ad requests based on their associated bid amounts and select advertisements from ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 235 receives a request to present a feed of content (also referred to as a "content feed") to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user. For example, content items or other data associated with users connected to the identified user are retrieved. Additionally, one or more ad requests may be retrieved from the ad request store 230. The retrieved content items or ad requests are analyzed by the content selection module 235 to identify candidate content items that are likely to be relevant to the identified user. For example, content items associated with users not connected to the identified user or content items associated with users for which the identified user has less than a threshold affinity are discarded as candidate content items. Based on various criteria, the content selection module 235 selects one or more of the candidate content items or ad requests identified as candidate content items for presentation to the identified user. The selected content items or advertisements from selected ad requests are included in a feed of content that is presented to the user. For example, the feed of content includes at least a threshold number of content items describing actions associated with users connected to the user via the online system 140.

In various embodiments, the content selection module 235 presents content to a user through a feed including a plurality of content items selected for presentation to the user. One or more advertisements may also be included in the feed. The content selection module 235 may also determine an order in which selected content items or advertisements are presented via the feed. For example, the content selection module 235 orders content items or advertisements in the feed based on likelihoods of the user interacting with various content items or advertisements.

In various embodiments, the online system 140 allows physical locations to be associated with content items and allows geographic attributes, which describe a geographic region including a specific physical location or including a portion of an area surrounding the specific physical location, to be associated with users. To allow association of physical locations with users or content items, the online system maintains maps representing various geographic areas that are divided into sets of geo-tiles. The geo-tile store 240 includes stores the geo-tiles along with information describing the geo-tiles and maps. Each geo-tile represents a portion of a map. For example, a map representing four square miles of a town is divided into four geo-tiles that each represent a one square mile quadrant of the town. The geo-tile store 240 may include geo-tiles of various sizes. In some embodiments, a size of a geo-tile is based on a density of objects (e.g., buildings, streets, population, etc.) included in an area represented by the geo-tile. For example, each geo-tile of a map represents an area of the map having a density of objects that is within a threshold amount of densities of areas of the map represented by other geo-tiles of the map. As an example, areas of the map including a relatively low number of objects are represented by larger geo-tiles, while areas of the map including a relatively high number of objects are represented by smaller geo-tiles. In other embodiments, a map representing a geographic area may be divided into multiple layers of geo-tiles, with each layer including geo-tiles having a particular level of resolution. For example, a layer includes small geo-tiles representing relatively smaller areas of the map with a relatively higher level of resolution represent and more specifically identify objects within the geo-tiles, while another layer includes relatively larger geo-tiles representing relatively larger areas of the map with a relatively lower level of resolution represent and less specifically identify objects within the geo-tiles.

Information describing a geo-tile stored in the geo-tile store 240 may include one or more of: a unique geo-tile identifier for the geo-tile, geographic coordinates of the area represented by the geo-tile, a size of the geo-tile, a description of the scale or of the geographic area represented by the geo-tile, an object density associated with the geo-tile, a level of specificity with which the geo-tiles identifies objects, and a description of the geographic area represented by the geo-tile. A description of a geographic area represented by a geo-tile may identify one or more specific physical locations included in the geo-tile (e.g., a physical address, specific geographic coordinates, a landmark) and may also identify one or more geographic regions each comprising a specific physical location and a threshold distance from the specific physical location.

As described below in conjunction with FIG. 3, the online system 140, for example the content selection module 235, generates indices describing various geographic regions included geo-tiles and in various sets of geo-tiles. The generated indices are stored in the geo-tile store 240. For example, the online system 140 computes a percentage of a city included in each geo-tile of a set of geo-tiles representing a neighborhood in the city and stores information describing the percentage of the city represented by each geo-tile in an index including geo-tile identifiers of geo-tiles including at least a portion the neighborhood in association with a value indicating a percentage of the city included in a geo-tile including at least a portion of the neighborhood in the geo-tile store 240. In various embodiments, the content selection module 235 accesses an index from the geo-tile store 240 when an opportunity to present a content item associated with a physical location to a user is identified to determine if a the physical location included in the targeting criteria includes at least a threshold portion of a geographic region specified by a geographic attribute associated with the user, as further described below in conjunction with FIG. 3.

The web server 245 links the online system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the online system 140 and the client device 110; for example, the messages are instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 245 may provide application programming interface (API) functionality to send data directly to native client device operating systems, such as IOS®, ANDROID™, or BlackberryOS.

Figure 3:
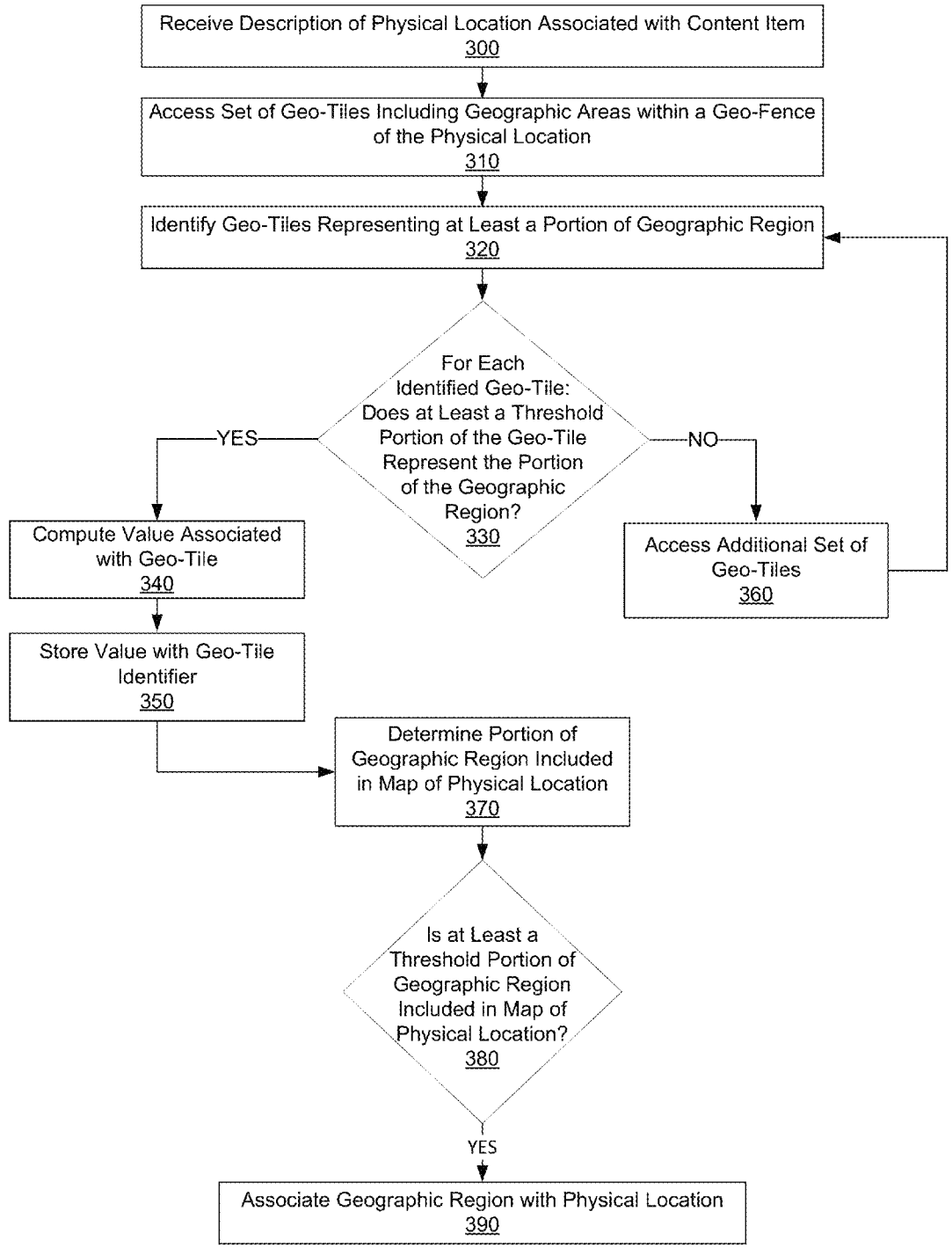
FIG. 3 is a flowchart of a method for associating a geographic attribute with a physical location including at least threshold portion of a geographic region described by the geographic attribute, in accordance with an embodiment.

Determining if a Geographic Region is within a Threshold Distance of a Physical Location FIG. 3 is a flowchart of one embodiment of a method for associating a geographic attribute with a physical location including at least threshold portion of a geographic region described by the geographic attribute. In other embodiments, the method may include different and/or additional steps than those shown in FIG. 3. Additionally, steps of the method may be performed in different orders than the order described in conjunction with FIG. 3 in various embodiments.

The online system 140 receives 300 a description of a physical location associated with a content item, such as an advertisement request ("ad request") or other content item, for presentation to users of the online system 140. The physical location may be described in any suitable manner. For example, the physical location associated with the content item is described as: a physical address, a set of geographic coordinates, a name of a landmark, a name of neighborhood, or any other suitable description of a physical location. In some embodiments, the physical location associated with the content item corresponds to a retail location or other location for obtaining a product or a service identified by the content item. For example, the online system 140 receives 300 a description of a physical address associated with a content item. The physical location may be included in targeting criteria associated with the content item, so users associated with a physical location within a threshold distance from the physical location associated with the content item are eligible to be presented with the content item.

In some embodiments, the threshold distance from the physical location associated with the content item is included in the description of the physical location. For example, an ad request is associated with a physical location and a threshold distance from the physical location specified by a user providing the ad request to the online system 140. Alternatively, the online system 140 determines the threshold distance from the physical location based on information maintained by the online system 140. The threshold distance from the physical location identifies a "geo-fence," or boundary, from the physical location associated with the content item. Physical locations less than the threshold distance from the physical location associated with the content item are within the geo-fence and physical locations greater than the threshold distance from the physical location associated with the content item are outside determined to be outside of the geo-fence. The online system 140 determines users who are associated with a physical location within the geo-fence of the physical location associated with the content item are eligible to be presented with the content item. A geo-fence including a specific physical location may completely include one or more defined geographic regions (e.g., neighborhoods, communities, districts, etc.) and may include portions of other defined geographic regions (e.g., a portions of a neighborhood, portions of a town, portions of a county).

Figure 4A:
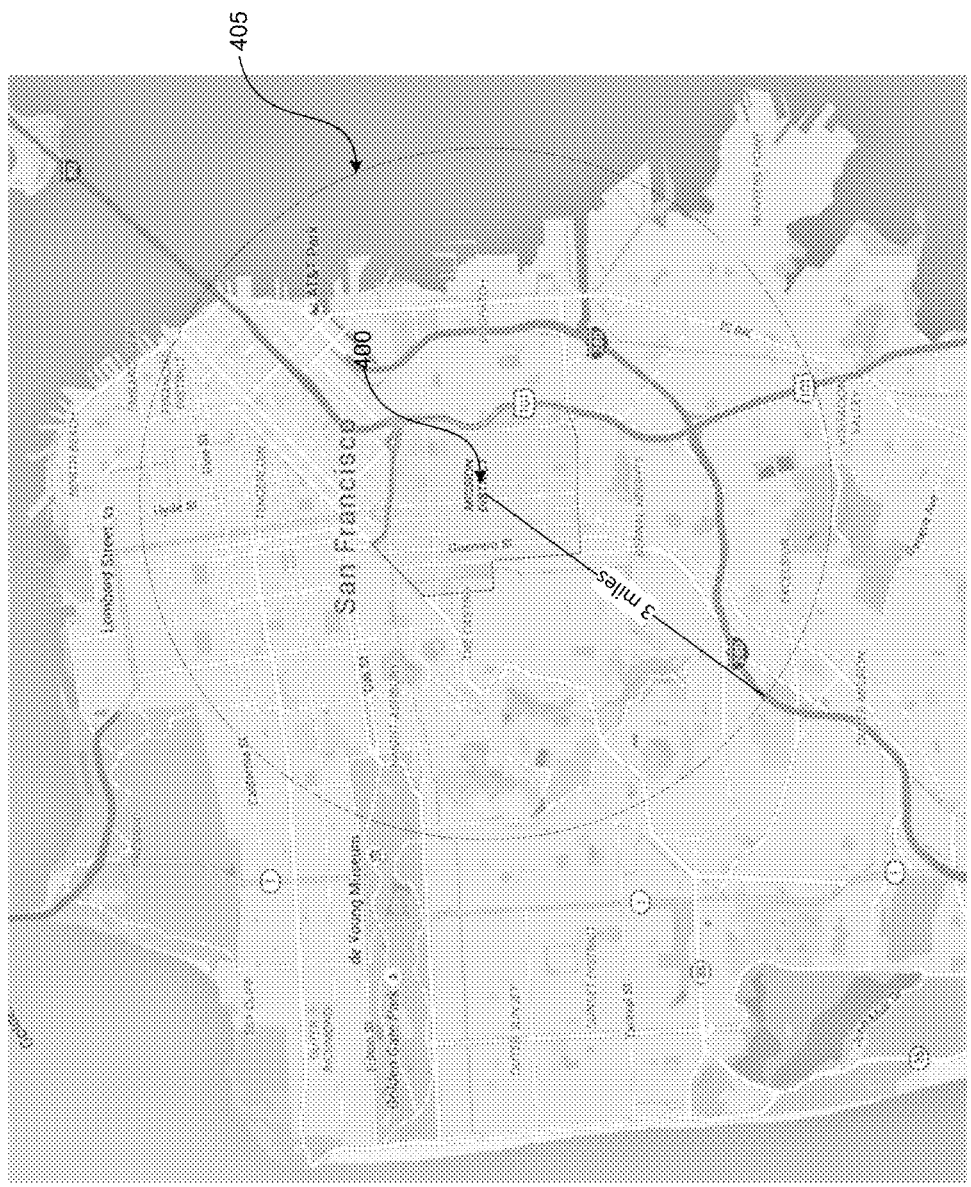
FIG. 4A is an illustration of information received by the online system describing a physical location and a surrounding geo-fence, in accordance with an embodiment.

In the example of FIG. 4A, the online system 140 receives 300 information describing a physical location 400, which is a specific neighborhood within the city of San Francisco, associated with a content item and a geo-fence 405 around the physical location 400 specifying a threshold distance of 3 miles from a center of the described physical location 400. For example, FIG. 4A is an example of the online system 140 receiving 300 a specific address associated with an ad request along with a threshold distance from the specific address, so an advertisement from the ad request is eligible for presentation to users associated with a physical address within the threshold distance from the specific address.

The online system 140 retrieves a map of the physical location associated with the content item. The retrieved map includes the geographic area within the geo-fence and accesses 310 a set of geo-tiles representing a geographic area within the geo-fence. In various embodiments, the online system 140 divides the map of the physical location associated with the content item and the geographic area within the geo-fence from the physical location associated with the content item into multiple geo-tiles that each represent a geographic area within the geo-fence. The online system 140 generates a unique geo-tile identifier for each geo-tile. For example, the online system 140 divides a map of a town that is 36 square miles into multiple mutually exclusive geo-tiles each including four square miles and including at least a portion of the town; the online system 140 also associates a unique geo-tile identifier with each of the geo-tiles.

Figure 4B:
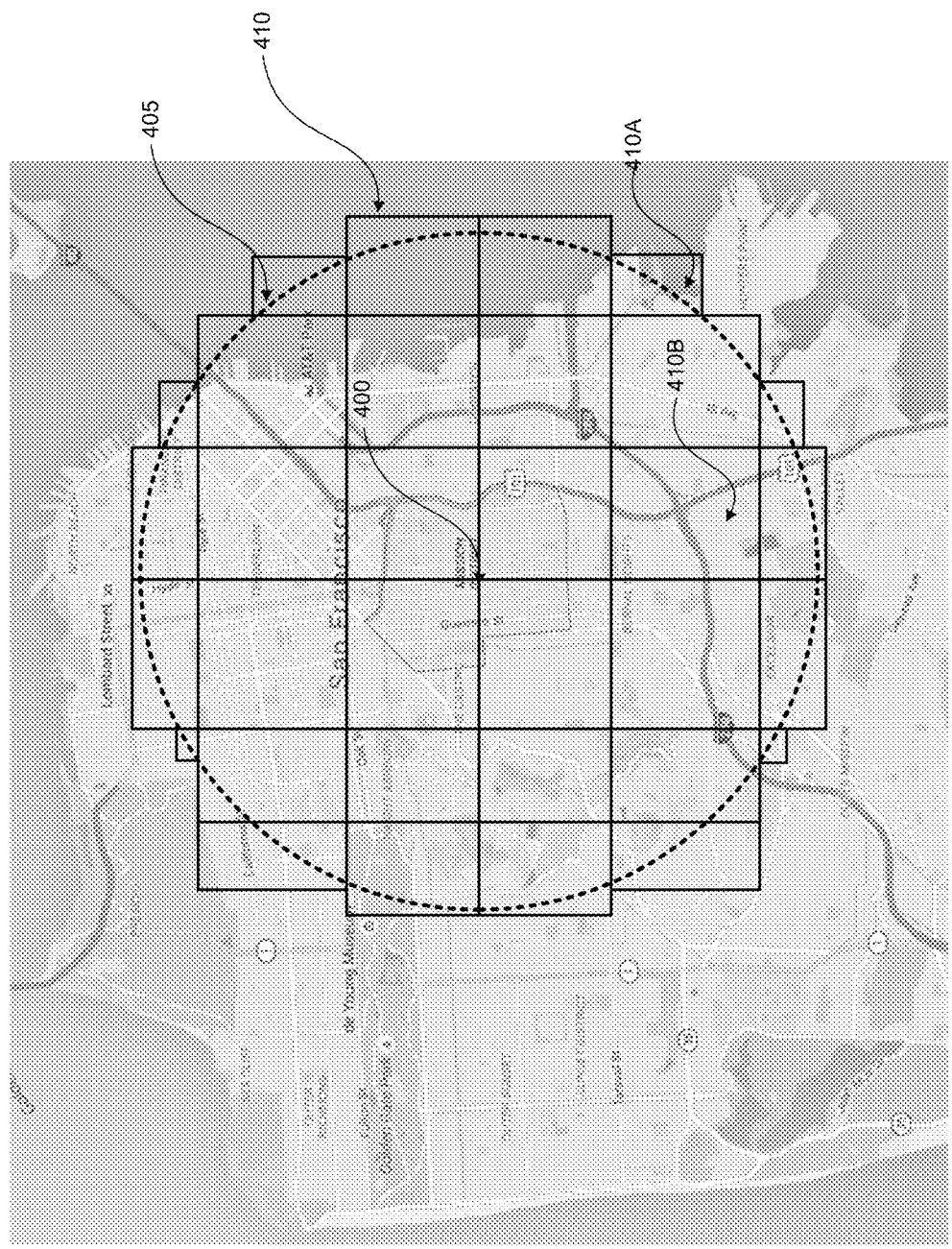
FIG. 4B is an example of a set of geo-tiles associated with a map of a physical location and a surrounding geo-fence, in accordance with an embodiment.

FIG. 4B shows an example of the online system 140 dividing a map including the physical location 400 associated with a content item and the geo-fence 405 surrounding the physical location 400 from FIG. 4A into mutually-exclusive geo-tiles 410. Each geo-tile represents a portion of a geographic area within the geo-fence 405, so the combination of geo-tiles 405 represents the geographic area within the geo-fence 405. A unique geo-tile identifier is associated with each geo-tile 410 by the online system 140. Alternatively, the online system 140 retrieves a stored set of geo-tiles 410 and corresponding geo-tile identifiers associated with the map including the physical location 400 (e.g., from the geo-tile store 240 or from a third-party system 130).

In various embodiments, different geo-tiles have different sizes. For example geo-tiles 410A and 410B in FIG. 4B are different sizes to allow the geo-tiles 410 to more accurately represent the geographic area within the geo-fence 405. In some embodiments, a size of a geo-tile is based on the density of objects (e.g., buildings, streets, population, etc.) included in a geographic area represented by the geo-tile. For example, a geo-tile includes a density of buildings within a threshold amount of densities of buildings within other geo0tiles; in this example, geo-tiles representing geographic areas including more buildings are smaller than geo-tiles representing geographic areas including fewer buildings. Additionally, the geographic area including the physical location and the geo-fence surrounding the physical location may be represented by multiple layers of geo-tiles in some embodiments. Different layers may include geo-tiles having different levels of resolution. For example, a layer includes small geo-tiles representing relatively smaller areas of the map with a relatively higher level of resolution represent and more specifically identify objects within the geo-tiles, while another layer includes relatively larger geo-tiles representing relatively larger areas of the map with a relatively lower level of resolution represent and less specifically identify objects within the geo-tiles.

Figure 5:
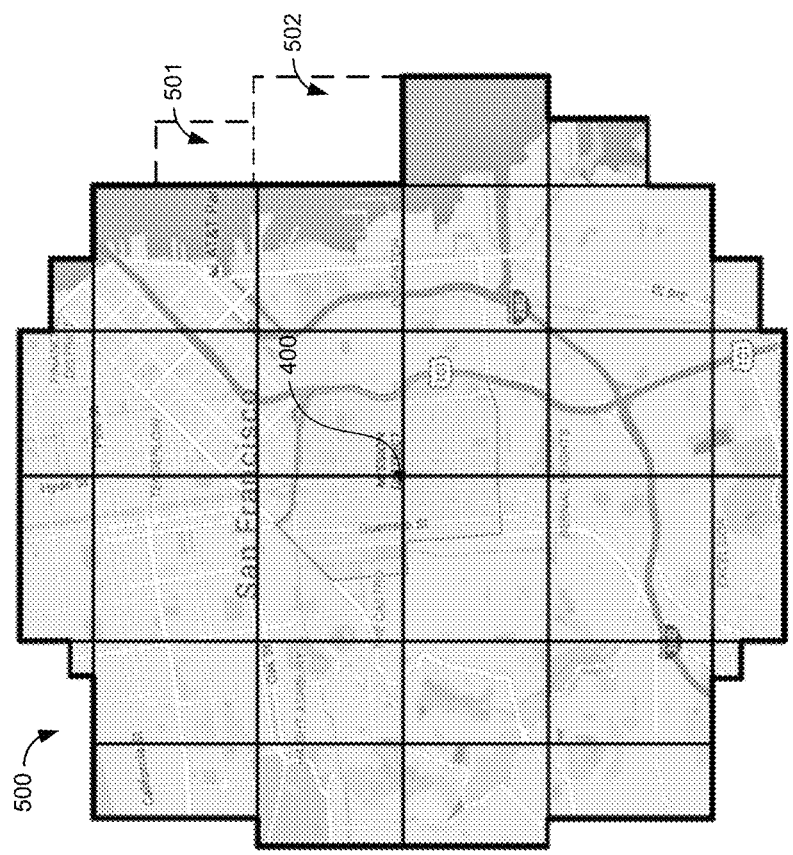
FIG. 5 is an example of a subset of geo-tiles representing at least a portion of a specific geographic region, in accordance with an embodiment.

The online system 140 identifies 320 geo-tiles in the accessed set of geo-tiles that represent at least a portion of a specific geographic region, which is a specific physical location and a threshold distance from the specific physical location to determine whether the physical location associated with the content item includes at least a threshold portion of the specific geographic region. For example, the online system 140 identifies 320 a set of geo-tiles representing geographic areas within a geo-fence of the physical location associated with the content item and determines whether the identified set of geo-tiles includes at least a threshold portion of the geographic area including the specific physical location. FIG. 5 shows a subset 500 of identified geo-tiles that represent at least a portion of a specific geographic region, which is a specific physical location and a threshold distance from the specific physical location, and are within the geo-fence of the physical location 400 associated with the content item shown in FIGS. 4A and 4B. For example, the subset 500 of identified geo-tiles represent a portion of a city (i.e., the specific physical location). Geo-tiles 501,502 that do not represent at least a portion of the specific geographic region are not identified 320 by the online system 140.

Figure 6:
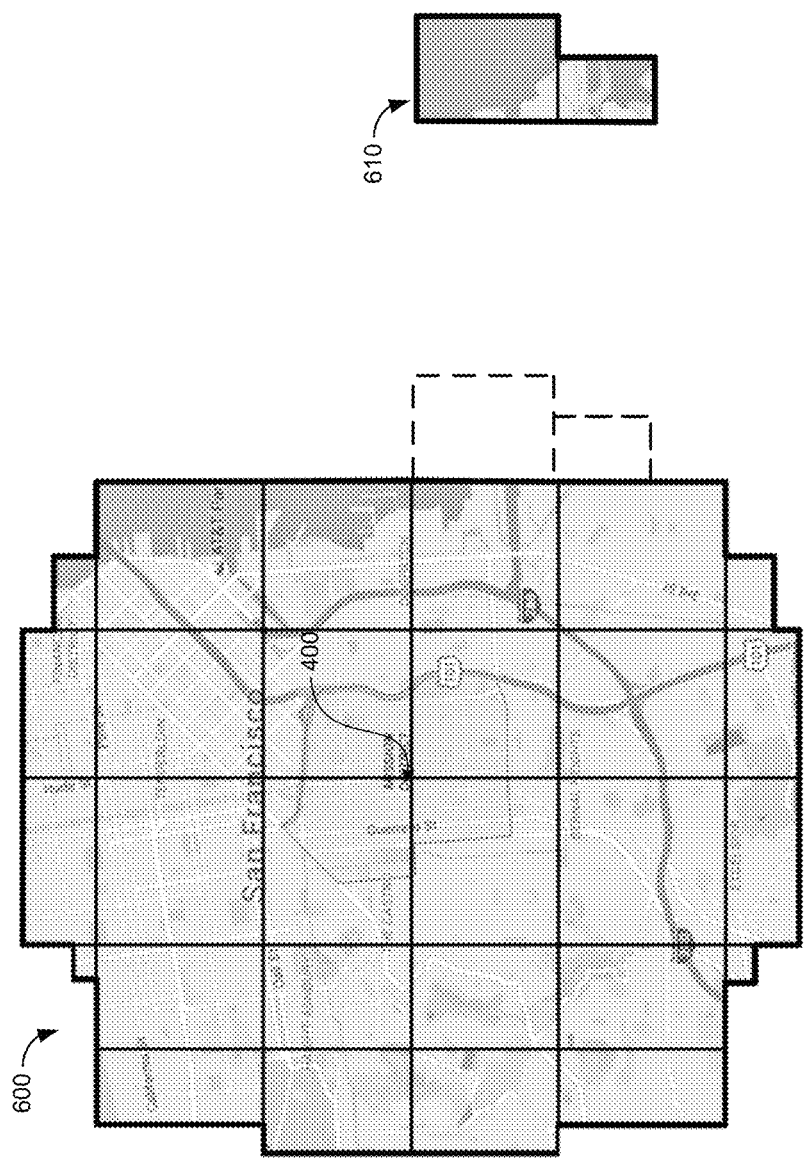
FIG. 6 is an example of subset of geo-tiles where at least a threshold portion of each geo-tile includes a portion of a geographic region, in accordance with an embodiment.

For each identified geo-tile that represents at least a portion of the specific geographic region, the online system 140 determines 330 whether at least a threshold portion of an identified geo-tile represents the portion of the specific geographic region. For example, the online system 140 computes a portion of an identified geo-tile that represents a portion of a city and determines 330 whether the computed portion equals or exceeds a threshold portion. In various embodiments, the portion of the identified geo-tile representing a portion of the specific geographic region is a percentage of the identified geo-tile that represents a portion of the geographic region. For example, referring to FIG. 6, the online system 140 determines 330 whether at least 50% of each identified geo tile represents a portion of the specific geographic region. In the example of FIG. 6, the online system 140 has identified 28 geo-tiles 600 in which at least 50% of the geo-tiles 600 represent a portion of the specific geographic region and two geo-tiles 610 in which less than 50% of the geo-tiles 610 represent a portion of the specific geographic region.

Referring back to FIG. 3, in response to determining 330 the portion of an identified geo-tile representing a portion of the specific geographic region equals or exceeds the threshold portion of identified the geo-tile, the online system 140 computes 340 a value associated with the identified geo-tile and stores 350 the value. For example, the online system 140 stores 350 the computed value in association with a geo-tile identifier corresponding to the identified geo-tile. In various embodiments, the value associated with the identified geo-tile is based at least in part on the portion of the specific geographic region represented by the identified geo-tile. For example, the value is a percentage of the specific geographic region represented by the identified geo-tile, which may be a ratio of an area of the portion of the specific geographic region represented by the identified geo-tile to an area of the specific geographic region. In another example, the value for the identified geo-tile is based in part on information obtained by the online system 140 describing a size of the specific geographic region and a size and location of the identified geo-tile in a map maintained by the online system 140. In another example, the value is a number of square miles of the area of the specific geographic region represented by the identified geo-tile. In various embodiments, the online system 140 computes and stores 350 a computed value for an identified geo-tile in an index in association with a geo-tile identifier associated with the identified geo-tile. The online system 140 may store additional information in the index in association with the geo-tile identifier, such as and information describing the physical location associated with the content item, the geo-fence including the physical location associated with the content item, and information identifying the specific geographic region. For example, the online system 140 computes 340 a value of 0.20 for an identified geo-tile representing 20 square miles of a 100 square mile specific geographic region and stores 350 the value in an index along with a geo-tile identifier uniquely associated with the identified geo-tile and information describing the physical location associated with the content item and describing the specific geographic region.

In response to determining 330 the portion of an identified geo-tile representing a portion of the specific geographic region is less than the threshold portion of the geo-tile, the online system 140 accesses 360 an additional set of geo-tiles that collectively represents the same geographic area represented by the identified geo-tile. In various embodiments, the online system 140 divides the identified geo-tile into smaller geo-tiles that each represent a portion of the identified geo-tile. For example, the online system 140 divides a section of a map represented by the identified geo-tile into an additional set of geo-tiles, where each of the additional set of geo-tiles represents a smaller area of the map than the area represented by the identified geo-tile. In other embodiments, rather than dividing the identified geo-tile, the online system 140 retrieves an additional set of geo-tiles, each geo-tile in the set representing a portion of the identified geo-tile. The additional set of geo-tiles accessed 360 by the online system 140 may include geo-tiles associated with various layers of geo-tiles having different object densities, resolutions, dimensions, or any other suitable characteristic. For example, the online system 140 accesses 360 an additional set of stored geo-tiles representing the section of the map represented by the identified geo-tile, where each geo-tile of the additional set has a lower object density or a higher geo-tile resolution than the object density or resolution, respectively, of the identified geo-tile.

Figure 7B:
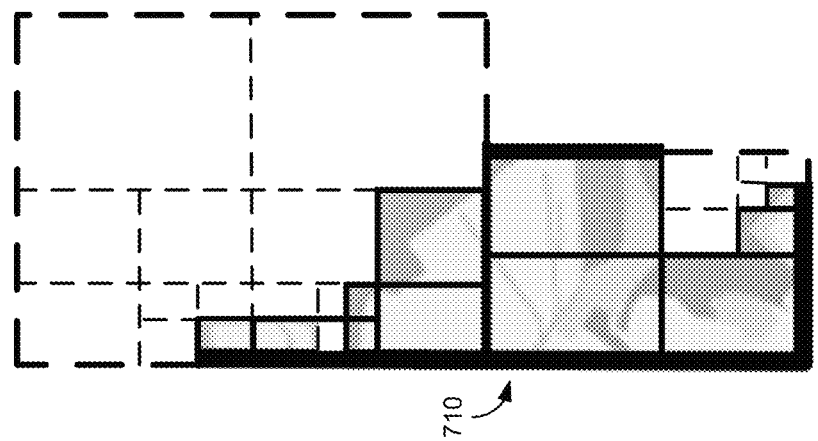
FIG. 7B is an example of a subset of an additional set of geo-tiles including at least a portion of a geographic region, in accordance with an embodiment.
Figure 7A:
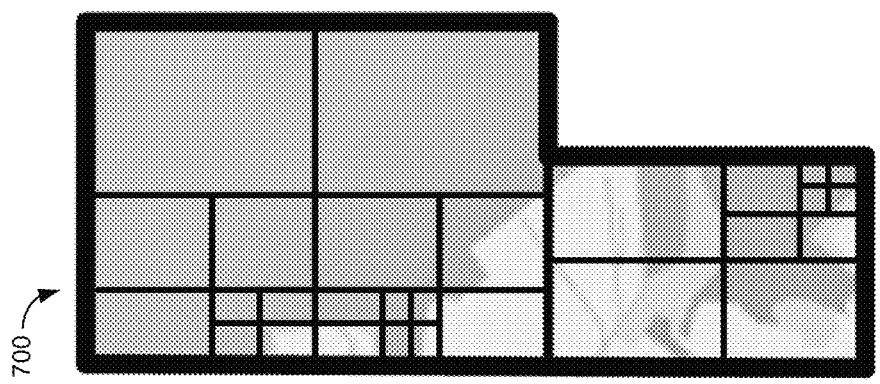
FIG. 7A is an example of an additional set of geo-tiles accessed by the online system in response to determining less than a threshold portion of a geo-tile includes a portion of a geographic region, in accordance with an embodiment.

Referring again to the example of FIG. 6, the online system 140 determines 330 the portion of each identified geo-tile 610 representing a portion of the specific geographic region is less than the threshold portion. In response to this determination, the online system 140 accesses 360 an additional set of mutually exclusive geo-tiles that collectively represent the same geographic area (e.g., section of a map including the specific location associated with the content item) represented by the two identified geo-tiles 610, as illustrated in FIGS. 7A and 7B. In FIG. 7A, the online system 140 divides the two identified geo-tiles 610 into an additional set 700 of geo-tiles that, when combined, represents the same section of the map as represented by the two identified geo-tiles 610. Each geo-tile from the additional set 700 of geo-tiles represents a smaller geographic area than the geographic area represented by an identified geo-tile 610 which was divided into the additional set 700 of geo-tiles. In some embodiments, a geo-tile of the additional set 700 of geo-tiles identifies objects within a geographic area represented by the geo-tile of the additional set 700 than the identified geo-tile 610 divided into the additional set 700. In some embodiments, an identified geo-tile 610 is divided so each geo-tile in the additional set 700 has a density of objects within a threshold amount of densities of objects of other geo-tiles in the set; accordingly, the additional set 700 may include geo-tiles having different sizes, as further described above.

As further described above in conjunction with FIGS. 3 and 5, the online system 140 identifies 320 geo-tiles of the additional set of geo-tiles that represent at least a portion of the specific geographic region and determines 330 whether at least a threshold portion of each of the identified geo-tiles from the additional set of geo-tiles represents the portion of the specific geographic region, as described above in conjunction with FIGS. 3 and 6. For each identified geo-tile of the additional set of geo-tiles in which at least a threshold portion of the identified geo-tile of the additional set of geo-tiles represents a portion of the specific geographic region, the online system 140 computes 340 a value associated with the identified geo-tile of the additional set of geo-tiles and stores 350 the value in association with a geo-tile identifier uniquely associated with the identified geo-tile of the additional set of geo-tiles, as further described above in conjunction with FIG. 3. For example, referring to FIG. 7B, the online system 140 identifies 11 geo-tiles 710 of the additional set 700 of geo-tiles that represent at least a portion of the specific geographic area and determines 330 whether a portion of an identified geo-tile 710 of the additional set 700 representing a portion of the specific geographic region equals or exceeds 50% of the identified geo-tile. In the example of FIG. 7B, the online system 140 identifies nine geo-tiles 710 from the additional set of geo-tiles 700 where at least 50% of the identified geo-tile 710 from the additional set 700 represents a portion of the specific geographic area. As further described above in conjunction with FIG. 3, the online system 140 computes 340 a value associated with each of the nine identified geo-tiles 710 from the additional set 700 and stores a value computed for an identified geo-tile 710 from the additional set 700 in association with a geo-tile identifier uniquely associated with the identified geo-tile from the additional set 700. In the example of FIG. 7B, the online system 140 also identifies two geo-tiles from the additional set of geo-tiles 700 in which less than 50% of the identified geo-tile represents a portion of the specific geographic area.

For each identified geo-tile of the additional set of geo-tiles in which less than the threshold portion of identified the geo-tile represents a portion of the specific geographic region, the online system 140 accesses 360 another additional set of geo-tiles that collectively represents the same geographic area represented by the identified geo-tile of the additional set of geo-tiles repeats the steps described above until all geo-tiles having at least a threshold portion representing a portion of the specific geographic region are identified, a value for each geo-tile having at least a threshold portion representing a portion of the specific geographic region is computed 340 and the computed values are stored 350. Hence, the online system 140 may compute 340 and store 350 values for geo-tiles having various sizes or resolutions representing geographic areas having various sizes or object densities to provide an area of the specific geographic region contained in each identified geo-tile.

Based on the stored value associated with each identified geo-tile, the online system 140 determines 370 a portion of the specific geographic region included in the geo-fence surrounding the physical location associated with the content item. In various embodiments, the online system 140 determines 370 the portion of the specific geographic region included in the geo-fence surrounding the physical location associated with the content item by combining the stored values associated with each identified geo-tile representing in which at least a threshold portion of an identified geo tile (or an identified geo tile from an additional set or from another additional set). For example, if the value stored 350 in association with an identifier for each identified geo-tile is a percentage of the specific geographic region represented by each identified geo-tile, the online system 140 determines 370 a portion of the specific geographic region included in the geo-fence surrounding the physical location associated with the content item by combining the percentages associated with the identified geo-tiles.

FIG. 8 shows index 800 stored by the online system 140 that includes values calculated for each identified geo-tile in which at least a threshold portion of a geo-tile represents a portion of a specific geographic area. The index 800 includes a geo-tile identifier associated with each identified geo-tile in which at least a threshold portion of a geo-tile represents a portion of a specific geographic area and a percentage of the specific geographic region represented by the geo-tile. For example, in FIG. 8, a geo-tile corresponding to geo-tile identified 6001 includes 0.13% of the specific geographic region. The online system 140 sums the values stored in the index 800 to determine 52.7% of the specific geographic region is included in the geo-fence surrounding the physical location associated with the content item. In some embodiments, the online system 140 combines the stored values associated with the smallest mutually exclusive geo-tiles representing geographic areas of the map to determine the portion of the specific geographic region included in the geo-fence surrounding the physical location associated with the content item. For example, if the online system 140 stores 350 a value associated with a identified geo-tile included in the geo-fence surrounding the physical location associated with the content item and values associated with smaller identified geo-tiles of an additional set of geo-tiles into which the identified geo-tile is divided, the online system 140 combines the stored values associated with the four smaller identified geo-tiles of the additional set of geo-tiles to determine 370 the portion of the specific geographic region included in the geo-fence surrounding the physical location associated with the content item.

As shown in FIG. 8, the index 800 may include additional information associated with geo-tiles, such as an amount of a geo-tile representing a portion of the specific geographic area. Other information may alternatively or additionally be stored in the index, such as a description of the physical location associated with the content item (e.g., geographic coordinates of the physical location associated with the content item), an identifier or a description of the geo-fence surrounding the physical location associated with the content item, a size (e.g., an area) of the geo-fence surrounding the physical location associated with the content item, an identifier of the specific geographic region (e.g., physical coordinates describing the specific geographic region, an identifier of the specific geographic region), an amount of the specific geographic region included in the geo-fence surrounding the physical location associated with the content item, coordinates of locations in the geo-fence surrounding the physical location associated with the content item that represent the specific geographic region, or any other suitable information, Based on the determined 370 portion of the specific geographic region included in the geo-fence surrounding the physical location associated with the content item, the online system 140 determines 380 whether at least a threshold portion of the specific geographic region is included in the geo-fence surrounding the physical location associated with the content item. For example, referring to FIG. 8, the online system 140 determines 380 whether the 52.7% of the specific geographic area included in the geo-fence surrounding the physical location associated with the content item, determined as further described above, surrounding the physical location associated with the content item equals or exceeds a threshold value. If the threshold value is 50%, the 52.7% of the specific geographic area included in the geo-fence surrounding the physical location associated with the content item exceeds the threshold value.

In various embodiments, if the portion of the specific geographic region included in the geo-fence surrounding the physical location associated with the content item equals or exceeds the threshold value, the online system 140 associates 390 the specific geographic region with the physical location. Hence, users associated with a geographic attribute identifying the specific geographic region are identified by the online system 140 as eligible to be presented with the content item associated with the specific physical location. For example, if the online system 140 receives an ad request including targeting criteria specifying an address for a restaurant and a threshold distance from the address for the restaurant and an advertisement, the online system 140 associates 390 a particular city having at least the threshold portion of the city within the threshold distance from the address for the restaurant with the ad request. In this example, the online system 140 identifies users associated with the particular city (e.g., identifying the particular city as a hometown or as a current location) as eligible to be presented with the advertisement from the ad request, even if the physical location of the users is outside of the threshold distance from the address for the restaurant. Hence, in various embodiments, one or more particular geographic regions are associated with a physical location, so online system users having a geographic attribute specifying a particular geographic region are eligible to be presented with a content item associated with the physical location. For example, the online system 140 retrieves one or more geographic attributes associated with a user and includes a content item having targeting criteria specifying a physical address in one or more selection processes for the user if a geographic region described by a geographic attribute associated with the user is associated with the physical address specified by the targeting criteria, determined based on an index maintained for the geographic region and for the physical address specified by the targeting criteria as further described above in conjunction with FIGS. 3-8.

Example geographic attributes that may be associated with users and specify a geographic region include a hometown, a workplace, a birthplace, and a current location (e.g., a location received from a client device 110 associated with the user). The geographic region may be specified in any suitable format, such as a city name, a zip code, an area code, a street address, geographic coordinates, or any other suitable information. A geographic attribute may be associated with a user by the online system 140 based on information provided to the online system 140 by the user, based on information received by the online system 140 from one or more client devices 110 associated with the user, from physical locations specified in content provided to the online system 140 by the user, or based on any other suitable information.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
accessing, at an online system, a set of geo-tiles associated with a map of a physical location, each geo-tile representing a section of the map;
determining, for each geo-tile, whether a threshold portion of the geo-tile represents a portion of a geographic region;
responsive to determining at least the threshold portion of the geo-tile represents a portion of the geographic region:
computing a value associated with the geo-tile, the value based at least in part on the portion of the geographic region represented by the geo-tile, and
storing the computed value with an identifier associated with the geo-tile;
responsive to determining less than the threshold portion of the geo-tile represents the portion of the geographic region:
accessing an additional set of geo-tiles, the additional set of geo tiles collectively representing the section of the map of the physical location region represented by the geo-tile,
determining, for each of the additional set of geo-tiles, whether a portion of the geo-tile representing the portion of the geographic region is at least the threshold portion,
responsive to determining at least the threshold portion of the geo tile of the additional set represents a portion of the geographic region,
computing the value associated with the geo-tile, and
storing the computed value with an identifier associated with the geo-tile;
determining the portion of the geographic region included in the map based at least in part on the stored values; and
storing the determined portion in an index associated with the geographic region and the map of the physical location.

2. The method of claim 1, further comprising:
determining whether the portion of the geographic region included in the map is at least a threshold portion of the geographic region based at least in part on the stored index.

3. The method of claim 1, wherein accessing the additional set of geo-tiles comprises:
for each geo-tile having less than the threshold portion representing the portion of the geographic region, dividing the section of the map represented by the geo-tile into the additional set of geo-tiles, each of the additional set of geo-tiles representing a smaller section of the map represented by the geo-tile; and
repeating the dividing until at least the threshold portion of the geographic region is represented by each of the additional set of geo-tiles.

4. The method of claim 1, wherein the set of geo-tiles and the additional set of geo-tiles include geo-tiles of various sizes.

5. The method of claim 1, wherein the physical location comprises a geographic area within a threshold distance of the physical location.

6. The method of claim 1, wherein the physical location is selected from a group consisting of: a physical address, a set of geographic coordinates, a neighborhood, a landmark, and any combination thereof.

7. The method of claim 1, wherein the geographic region is selected from a group consisting of: a city, a zip code, an area code, a neighborhood, a county, and any combination thereof.

8. The method of claim 1, further comprising:
receiving criteria for presenting a content item to one or more users of the online system, the criteria including the physical location and a threshold distance from the physical location;

determining whether the portion of the geographic region included in the map equals or exceeds a threshold value based at least in part on the index; and
responsive to determining the portion of the geographic region included in the map equals or exceeds the threshold value, associating the geographic region with the criteria.

9. The method of claim 8, further comprising:
receiving a request to present content to a user of the online system;
responsive to determining an attribute of the user identifies the geographic region included in the map, including the content item in selection process selecting content for presentation to the user.

10. The method of claim 9, wherein the attribute of the user identifying the geographic region included in the map is selected from a group consisting of: a hometown, a workplace, a current location, a birthplace, and any combination thereof.

11. A method comprising:
retrieving, at an online system, a set of geo-tiles associated with a map of a physical location, each geo-tile representing a section of the map and at least a portion of a geographic region;
for each geo-tile, generating one or more additional sets of geo-tiles, each additional set of geo-tiles representing a portion of the section of the map represented by the geo-tile;
identifying, from the one or more additional sets of geo-tiles, a subset of geo-tiles, wherein at least a threshold portion of each of the subset of geo-tiles represents the portion of the geographic region;
computing a value associated with each of the subset of geo-tiles, the value for a geo-tile of the subset based at least in part on the portion of the geographic region represented by the geo-tile of the subset of geo-tiles;
storing the computed values with identifiers associated with a corresponding geo-tile of the subset of geo-tiles;
determining whether the portion of the geographic region included in the map is at least a threshold portion based at least in part on the stored values; and
storing the determined portion in an index associated with the geographic region and the map of the physical location.

12. The method of claim 11, wherein generating one or more additional sets of geo-tiles comprises:
for each geo-tile, dividing the section of the map represented by the geo-tile into a set of smaller geo-tiles, each smaller geo-tile representing a portion of the section of the map represented by the geo-tile; and
repeating the dividing until less than a threshold portion of the geographic region is represented by each of the set of smaller geo-tiles.

13. A computer program product comprising a non-transitory computer-readable storage medium having instructions encoded thereon that, when executed by a processor, cause the processor to:
access, at an online system, a set of geo-tiles associated with a map of a physical location, each geo-tile representing a section of the map;
determine, for each geo-tile, whether a threshold portion of the geo-tile represents a portion of a geographic region;
responsive to determining at least the threshold portion of the geo-tile represents a portion of the geographic region:

compute a value associated with the geo-tile, the value based at least in part on the portion of the geographic region represented by the geo-tile, and
store the computed value with an identifier associated with the geo-tile;
responsive to determining less than the threshold portion of the geo-tile represents the portion of the geographic region:
access an additional set of geo-tiles, the additional set of geo-tiles collectively representing the section of the map of the physical location region represented by the geo-tile,
determine, for each of the additional set of geo-tiles, whether a portion of the geo-tile representing the portion of the geographic region is at least the threshold portion,
responsive to determining at least the threshold portion of the geo-tile of the additional set represents a portion of the geographic region,
compute the value associated with the geo-tile, and
store the computed value with an identifier associated with the geo-tile;
determine the portion of the geographic region included in the map based at least in part on the stored values; and
store the determined portion in an index associated with the geographic region and the map of the physical location.

14. The computer program product of claim 13, wherein the non-transitory computer-readable storage medium further has instructions encoded thereon that, when executed by the processor, cause the processor to:
determine whether the portion of the geographic region included in the map is at least a threshold portion of the geographic region based at least in part on the stored index.

15. The computer program product of claim 13, wherein access the additional set of geo-tiles comprises:
for each geo-tile having less than the threshold portion representing the portion of the geographic region, divide the section of the map represented by the geo-tile into the additional set of geo-tiles, each of the additional set of geo-tiles representing a smaller section of the map represented by the geo-tile; and
repeat the dividing until at least the threshold portion of the geographic region is represented by each of the additional set of geo-tiles.

16. The computer program product of claim 13, wherein the physical location comprises a geographic area within a threshold distance of the physical location.

17. The computer program product of claim 13, wherein the non-transitory computer-readable storage medium further has instructions encoded thereon that, when executed by the processor, cause the processor to:
receive criteria for presenting a content item to one or more users of the online system, the criteria including the physical location and a threshold distance from the physical location;
determine whether the portion of the geographic region included in the map equals or exceeds a threshold value based at least in part on the stored index; and
responsive to determining the portion of the geographic region included in the map equals or exceeds the threshold value, associate the geographic region with the criteria.

18. The computer program product of claim 17, wherein the non-transitory computer-readable storage medium further has instructions encoded thereon that, when executed by the processor, cause the processor to:
receiving a request to present content to a user of the online system;
responsive to determining an attribute of the user identifies the geographic region included in the map, including the content item in selection process selecting content for presentation to the user.

19. The computer program product of claim 18, wherein the attribute of the user identifying the geographic region included in the map is selected from a group consisting of: a hometown, a workplace, a current location, a birthplace, and any combination thereof.

20. The computer program product of claim 13, wherein the physical location comprises a geographic area within a threshold distance of the physical location.

\* \* \* \* \*